UNITED STATES PATENT OFFICE.

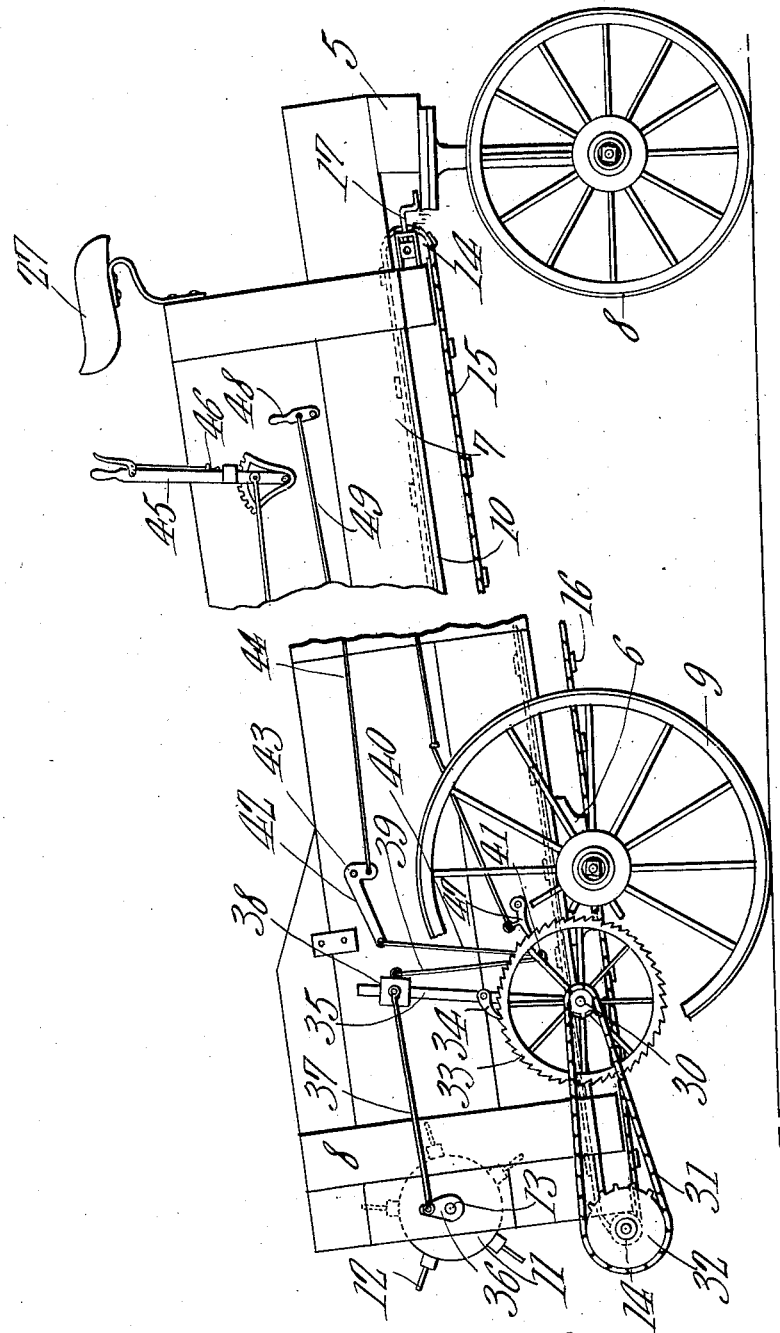

JOHN F. HEEREN, OF LEMARS, IOWA.

CONVEYER-SPEED-VARYING MECHANISM FOR MANURE-SPREADERS.

1,088,225.  Specification of Letters Patent. Patented Feb. 24, 1914.

Application filed August 12, 1910. Serial No. 576,785.

*To all whom it may concern:*

Be it known that I, JOHN F. HEEREN, a citizen of the United States, residing at Lemars, in the county of Plymouth and State of Iowa, have invented a new and useful Conveyer-Speed-Varying Mechanism for Manure-Spreaders, of which the following is a specification.

This invention relates to apparatus designed for conveying, spreading and distributing manure, a wagon being provided which carries a conveyer for moving the material at the rear end of the wagon box, at which end is mounted a distributing cylinder which spreads the material and throws it out of the wagon box onto the ground.

It is the object of the present invention to provide in an apparatus of the kind stated an improved mechanism for varying the speed of the conveyer, which object is accomplished by a novel construction and arrangement of parts to be hereinafter described and claimed.

The invention is illustrated in the accompanying drawing forming a part of this specification, which is a side elevation of the machine, parts broken away.

Referring specifically to the drawings, 5 and 6 denote, respectively, the front and rear bolsters which support the wagon box, the near side wall of the latter being indicated at 7. The front and rear wheels of the wagon are indicated at 8 and 9, respectively. The wagon box is arranged so that it slopes downwardly in the direction of its rear end to facilitate the discharge of the material. The rear end of the wagon box is open, and extending across said open end, a suitable distance above the bottom 10 of the wagon box is a distributing cylinder 11 which is armed with radially extending tines 12 as usual. The wagon box side walls are provided with suitable bearings in which the shaft 13 of the distributing cylinder is supported.

Beneath the wagon box, at the front and rear ends thereof are mounted sprocket wheels 14 over which travel sprocket chains 15. Two of these chains are provided, and said chains carry cross slats 16 which work across the bottom 10 of the wagon box, the travel of the slats being from the front to the rear end of the wagon box, whereby the material is carried to the latter end. The front sprocket wheel 14 is provided with means for adjustment by means of a crank handle 17 to take up slack in the chain.

The shaft 13 is driven from one of the rear wheels 9 in a manner not necessary to illustrate or describe in detail.

The mechanism for driving the conveyer consisting of the chains 15 and the cross slats 16 comprises the following instrumentalities: On the near side of the wagon is mounted a sprocket wheel 30 which is connected by a chain 31 to a sprocket wheel 32 on the shaft of the rear sprocket wheel 14 of the conveyer. On the shaft of the sprocket wheel 30 is mounted so as to turn therewith a ratchet wheel 33 which is actuated by a pivoted pawl 34 carried by a lever 35 which is pivoted at its lower end on said axle of the sprocket wheel 30. The lever 35 is operated from a crank 36 on the shaft 13 of the distributing cylinder 11, said crank being connected by a pitman rod 37 to a block 38 slidable vertically on the lever 35. It will be evident from the foregoing that when the distributing cylinder is in operation, the lever 35 will be oscillated through the crank 36 and the pitman rod 37, and will impart a step by step rotary movement to the ratchet wheel 33 through the pawl 34. This rotary movement of the ratchet wheel is transmitted by the chain 31 to the sprocket wheel 32, whereupon the shaft of the rear sprocket wheel 14 is rotated, and the conveyer is thus put in motion. Inasmuch as the conveyer is driven from the distributing cylinder, it will be seen that when said cylinder is thrown into or out of gear, the conveyer will also be thrown into or out of gear.

The block 38 is provided to change the stroke of the lever 35, the stroke being lengthened by depressing the block in the direction of the pivot of the lever, and shortened when the block is raised in the opposite direction.

The cardinal feature of the present invention resides in the novel means for adjusting the block 38, in order that the block may move in an untrammeled manner without the liability of the block to gravitate or move downward on the lever 35. This adjusting means resides in the long link 39 pivoted at its upper end to the block 38 and pivoted at its lower end to the lower end of a link 40, which latter link is pivoted at its upper end to one arm of an adjusting lever 42 arranged adjacent the oscillating lever 35. This adjusting lever 42, which is fulcrumed as at 43, is connected by means of a rod 44 to a hand lever 45 bearing a suitable latch 46 for locking the same in position. The ratchet wheel 33 is prevented from retrograde movement by means of a pawl 47 which is connected to a suitable hand lever 48 by means of a rod 49. Thus, it will be evident that the links 39 and 40 permit the block 38 to move in an untrammeled manner, but as these links tend to permit the block 38 to gravitate on the lever 35, it is essential that some means should be provided whereby this disadvantage is overcome. For this reason, the link 40 is somewhat longer than the link 39, and the links are so disposed that they swing into coincidence during each oscillation of the lever 35. The block 38 is also made to slide tightly on the lever 35 so as to have little tendency to gravitate. However, in use, should the jarring of the vehicle or the movement of the parts tend to cause the block 38 to gravitate slightly, this gravitation of the block will be overcome for the reason that when the links 39 and 40 swing into coincidence, they will cause the block to assume its initial adjusted position. This is due to the fact that the upper pivoted points of the links do not swing together so as to permit the links to swing when they are in coincidence, and as a result, when the links are in coincidence, they are locked against swinging. Naturally, when the links swing toward one another, there will be a tendency to raise the block 38 to normal position, should the block have gravitated due to any cause. The oscillation of the lever 35 may be varied by swinging the hand lever 45, as will be understood, the hand lever 45 being swung gradually so as to permit the block 38 to gravitate or ascend to its new position.

From the foregoing, it will be noted, that the block 38 is not connected directly to any adjustable member so as to have a trammeled motion, but on the other hand, may move freely with the lever 35 without a sliding movement thereon. This untrammeled movement of the block 38 is permitted by the two links 39 and 40, and the gravitation of the block is prevented by the difference in lengths of the links and the fact that the links coincide during each oscillation of the levers.

In operation, the wagon box is loaded, with the material to be distributed, and is then driven to the place where said material is to be deposited, the shaft 13, at this time, being inoperative. Upon arriving at the place of distribution, the shaft 13 is brought into operation by means not shown, whereupon the distributing cylinder 11 and the conveyer are thrown into operation, and the material is carried by the conveyer to the rear end of the wagon box, and scattered and pitched out of the same by the distributing cylinder. When the wagon is emptied, the mechanism is thrown out of gear, and the wagon is then reloaded.

The invention is characterized by simplicity, light weight, cheapness and durability and ease of operation.

What is claimed is:

In a device of the class described, a supporting structure, an upright lever having its lower end fulcrumed thereto, a ratchet wheel carried by the said structure, a pawl pivoted to the lever and coöperating with the ratchet wheel, a block slidable tightly on the lever, means connected to the block for oscillating the lever, an adjusting member carried by the said structure adjacent the lever, and a pair of links of different lengths pivoted together at their lower ends, and pivoted at their upper ends to the block and adjusting member, respectively, the links permitting the block to swing untrammeled and being adapted to swing into coincidence during each oscillation of the lever so as to maintain the block in its adjusted position.

In testimony that I claim the foregoing as my own, I have hereto affixed my signature in the presence of two witnesses.

JOHN F. HEEREN.

Witnesses:
FRANK M. ROSEBERRY,
N. N. ZINK.

---

Copies of this patent may be obtained for five cents each, by addressing the "Commissioner of Patents, Washington, D. C."